US012227343B2

(12) United States Patent
Kruse et al.

(10) Patent No.: US 12,227,343 B2
(45) Date of Patent: Feb. 18, 2025

(54) RETAIL READY OPENING FEATURE FOR E-COMMERCE CARTON

(71) Applicant: Blue Buffalo Enterprises, Inc., Wilton, CT (US)

(72) Inventors: Michael Kruse, Plymouth, MN (US); Jeffrey Steven Pederson, Lakeville, MN (US); Anthony W. Swenson, Blaine, MN (US)

(73) Assignee: Blue Buffalo Enterpises, Inc., Wilton, CT (US)

( * ) Notice: Subject to any disclaimer, the term of this patent is extended or adjusted under 35 U.S.C. 154(b) by 18 days.

(21) Appl. No.: 18/122,827

(22) Filed: Mar. 17, 2023

(65) Prior Publication Data
US 2024/0308725 A1    Sep. 19, 2024

(51) Int. Cl.
*B65D 5/54* (2006.01)
*B65D 5/468* (2006.01)
*G06Q 10/0832* (2023.01)

(52) U.S. Cl.
CPC ......... *B65D 5/5445* (2013.01); *B65D 5/4608* (2013.01); *G06Q 10/0832* (2013.01)

(58) Field of Classification Search
CPC ...... B65D 5/4266; B65D 5/5445; B65D 5/54; B65D 5/5455; B65D 5/6623; G06Q 10/0832
(Continued)

(56) References Cited

U.S. PATENT DOCUMENTS 4,363,405 A * 12/1982 Christie ............... B65D 33/001
                                                206/774
5,385,234 A    1/1995 Stout et al.
(Continued)

FOREIGN PATENT DOCUMENTS

KR       20110011560        12/2011
WO   WO-2006060154 A1 *  6/2006  ............. B32B 15/08
WO    WO 2010/091229        8/2010

OTHER PUBLICATIONS

Fulkerson, "Better Packaging, Happy Pets, and a Win for the Environment", Retrieved from the Internet: https://www.aboutamazon.com/news/sustainability/better-packaging-happy-pets-and-a-win-for-the-environment, May 20, 2019.

*Primary Examiner* — Rafael A Ortiz
(74) *Attorney, Agent, or Firm* — Jordan IP Law, LLC; Annette M. Frawley, Esq.

(57) ABSTRACT

A modified Regular Slotted Container (RSC) style carton is configured to be easily shipped in electronic commerce while allowing a consumer to use the carton as a storage container for bagged pet food. The packaging carton is a modified regular slotted container (RSC) featuring a full or partial die cut perforation design forming a lid that facilitates converting the carton into a re-usable storage carton for a bag of pet food. The perforation design allows for the consumer to separate portions of the lid from the carton along the perforations. Once the carton is opened, the die cut or partial die cut flap created along the perforations is preferably used as a lid for the pet food. The carton provides many advantages, such as establishing protective packaging, accommodating dedicated e-commerce identifiers, and providing additional ways to use and store a bagged pet food product without having to purchase alternative containers.

9 Claims, 6 Drawing Sheets (58) Field of Classification Search
USPC .......................................................... 206/774
See application file for complete search history.

(56) References Cited

U.S. PATENT DOCUMENTS

| | | | | |
|---|---|---|---|---|
| 5,881,884 | A * | 3/1999 | Podosek | B65D 5/5445 |
| | | | | 206/774 |
| 6,435,351 | B1 * | 8/2002 | Gibb | B65D 5/542 |
| | | | | 206/774 |
| 7,296,731 | B2 | 11/2007 | Auclair et al. | |
| 8,752,708 | B2 * | 6/2014 | Keefe | B65D 5/5445 |
| | | | | 206/774 |
| 9,205,948 | B1 | 12/2015 | Block | |
| 10,131,462 | B2 | 11/2018 | Capistrant et al. | |
| 10,370,141 | B2 | 8/2019 | Prakken | |
| 10,683,133 | B2 | 6/2020 | Purkey et al. | |
| 10,981,693 | B2 * | 4/2021 | Spivey, Sr. | B65D 77/38 |
| 10,981,963 | B2 * | 4/2021 | Rosenlöf | C07K 14/4717 |
| 2005/0006447 | A1 | 1/2005 | Caroli | |
| 2006/0283928 | A1 * | 12/2006 | Walsh | B65D 5/744 |
| | | | | 493/51 |
| 2011/0284621 | A1 * | 11/2011 | Couture | B65D 5/5445 |
| | | | | 206/774 |
| 2015/0329235 | A1 | 11/2015 | Armiento et al. | |
| 2019/0023449 | A1 * | 1/2019 | Barton | B65D 77/22 |
| 2022/0097903 | A1 * | 3/2022 | Couture | B65D 5/5445 |

* cited by examiner

RETAIL READY OPENING FEATURE FOR E-COMMERCE CARTON

FIELD OF THE INVENTION

The invention generally pertains to a packaging carton particularly configured for the shipping and subsequent storing of a bag of pet food for use in electronic commerce.

BACKGROUND OF THE INVENTION

In connection with shipping products, it is known to package the products in a carton, seal the carton, and ship the carton for delivery from a manufacturer to either a designated retail establishment or directly to a consumer. Although various materials could be used in making the cartons, the most common material employed is cardboard. In general, cardboard is provided in the form of a blank which can be conveniently stored in a flat configuration but easily erected through a simple folding operation to establish a carton which can be filled and sealed, typically in an automated process. These cartons are not only lightweight and quite strong, but the material is advantageously recyclable.

One common carton style made from a blank is known as a regular slotted container. A regular slotted container designed to store or ship products typically has six sides that are all rectangular in shape. Each carton has four fixed side panels, four bottom flaps and four top flaps. All the flaps are the same length. The bottom flaps include two inner flaps which are folded first when forming the carton. The bottom flaps also include two outer flaps that extend one half the width of the carton. With this spacing, the outer flaps meet at a centerline of the carton when the outer flaps are closed. The cartons are filled at a factory or other processing site and then shipped. Upon arrival at a destination, the cartons are simply opened so that products may be removed, and the cartons then discarded or recycled.

In some situations, the cartons, commonly called end load cartons, are designed with a closure system which enables the end of the carton to be opened to fill the carton with product. The carton is designed to be opened and closed numerous times prior to depleting the product therein. In this manner, the carton may be used not only for shipping but also for dispensing of product. For example, it is widely known to package cereal and other food products in end load cartons and to provide the cartons with closure systems operating between upper and lower flaps of top portions of the cartons. In addition to end load cartons, top load cartons are popular for foods and other products. For example, donuts and other food products are often packaged in top load cartons, each including a cover which extends across an entire open top of the carton, with the cover being hinged to enable selective, repeated access to a product storage region of the carton.

In the case of dry dog or cat food, the pet food is often placed and sold in a bag, with the food being displayed in the bag on a store shelf for purchase by a consumer. Between one or more of the transport locations, such pet food bags may be damaged, specifically torn open. To address this concern, at least in connection with shipping dry pet food bags to distribution points and then to retain stores, it is common to place multiple bags in a protective carton. Often the cartons are opened at the retail store so that the bags of pet food can be directly displayed for purchase by consumers. In the case of larger sized bags of dry pet food, such as 60-80 lb bags, various bags are loaded on a pallet and wrapped together to protect the products during transport. In other situations, some cartons are meant for retail sale and are taken home with the customer, who opens the carton at home, removes the bag and then disposes of the carton.

With the advent of electronic commerce, it has become desirable to ship products, including bags of dry pet food, directly to consumers. In the case of large, e.g., 60-80 lb dry pet food bags, these bags are quite large so cannot be easily maneuvered by a consumer, or easily stored. Lifting a heavy bag of pet food to fill a pet food bowl is simply not easy or convenient and can lead to bags being dropped or spilled. As a result, the pet food is often dispensed directly from the bag which is propped up in a storage area. However, this scenario has disadvantages ranging from bag sealing issues leading to odor problems to animals being able to chew through exposed bags.

To address these concerns, it is known for a consumer to transfer the contents of a dry pet food bag to another container, such as a dedicated plastic container, and then periodically dispense the pet food from the container. Using a plastic container can be convenient, at least after the strenuous transfer is made. In addition, such containers are often sized to only hold a portion of the bag, thereby requiring refilling and, correspondingly, storing of the exposed bag between fillings. In addition, a certain amount of pet food residue will remain in the container between fillings, with this residue potentially resulting in health issues for the pet(s).

If the pet food bags are simply left in their original shipping cartons, there are certain advantages over just having the large bags of food alone. In particular, with both the internal reclosing of the bag and the external closure of the carton, at least the ability to contain the odor of the food from exiting the carton and effectively keep animals out of the food between feedings are greatly enhanced. The cartons also provide storing advantages over large food bags, as the cartons retain their shape and can be readily stacked with similar cartons or other packaged products, whereas the large pet food bags do not afford this benefit. However, existing shipping cartons are just not considered to have problems connected with ability to be readily opened and closed, and/or handling issues. Indeed, a regular slotted container has four top flaps that can be opened and reclosed, but at least three, if not all four flaps, must be opened to access any bag contained therein, which is a cumbersome process. With the above in mind, there is a need in the art for a regular slotted container style carton that can be used as a shipping carton which can be easily picked up and moved, while also allowing a consumer to use the carton to store a bag of pet food while providing enhanced access to the bag within the carton for dispensing during feeding operations, with the carton being readily recyclable upon depletion of the dry pet food in the bag.

SUMMARY OF THE INVENTION

The invention provides for a packaging carton configured to protect a bag of dry pet food through shipping, while being specifically configured to enable a consumer to readily use the carton as a storage container for the pet food. More specifically, the packaging carton is a specifically designed slotted container or carton featuring a die cut or partial die cut perforation design facilitating conversion of the carton into a re-usable storage container with a selectively openable/closeable lid for a bag of pet food. The perforation design allows for the consumer to separate portions of the lid from the carton along the perforations. Once the carton is opened, the die cut or partial die cut flap created by the perforations establishes a reclosable lid for the pet food. The carton provides many advantages, such as providing easy packaging and allowing additional ways to use and store a product without having to purchase alternative containers.

More specifically, the invention is directed to a carton made of cardboard having six sides, all rectangular in shape. The carton has four fixed side panels, four bottom flaps and four top flaps. The bottom flaps include two inner flaps that are folded first when forming the carton. The bottom flaps also include two outer flaps which meet at a centerline of the carton when the outer flaps are closed. A lid is defined at least partially by perforations forming tear line segments including a frontal tear line segment in the front of the carton and a tear line segment extending in a first side panel from the front to the rear of the carton. The lid is configured to pivot about an axis at the rear of the carton. This overall arrangement advantageously provides for a carton which is designed to protect a pet food bag during shipping, easily maneuverable, and can be readily transformed into a holding bin with a pivoting lid for accessing the pet food bag. With the entire carton being made of recyclable materials, the carton is readily disposable once the bag of pet food is empty and thus avoids the problems associated with reusing a dedicated plastic container.

The preceding summary is provided to facilitate an understanding of some of the innovative features unique to the present disclosure and is not intended to be a full description. A full appreciation of the disclosure can be gained by taking the entire specification, claims, drawings, and abstract as a whole. Additional objects, features and advantages of the invention will become more readily apparent from the following detailed description when taken in conjunction with the drawings wherein like reference numerals refer to corresponding parts in the several views.

DETAILED DESCRIPTION OF THE PREFERRED EMBODIMENTS

The following detailed description should be read with reference to the drawings in which similar elements in different figures are numbered the same. The detailed description and the drawings, which are not necessarily to scale, set forth illustrative and exemplary embodiments and are not intended to limit the scope of the disclosure. Selected features of any illustrative embodiment can be incorporated into an additional embodiment unless clearly stated to the contrary. While the disclosure is amenable to various modifications and alternative forms, specifics thereof have been shown by way of example in the drawings and will be described in detail. Overall, it should be understood, however, that the intention is not to limit aspects of the disclosure to the particular illustrative embodiments described. On the contrary, the intention is to cover all modifications, equivalents, and alternatives falling within the spirit and scope of the disclosure.

Figure 1:
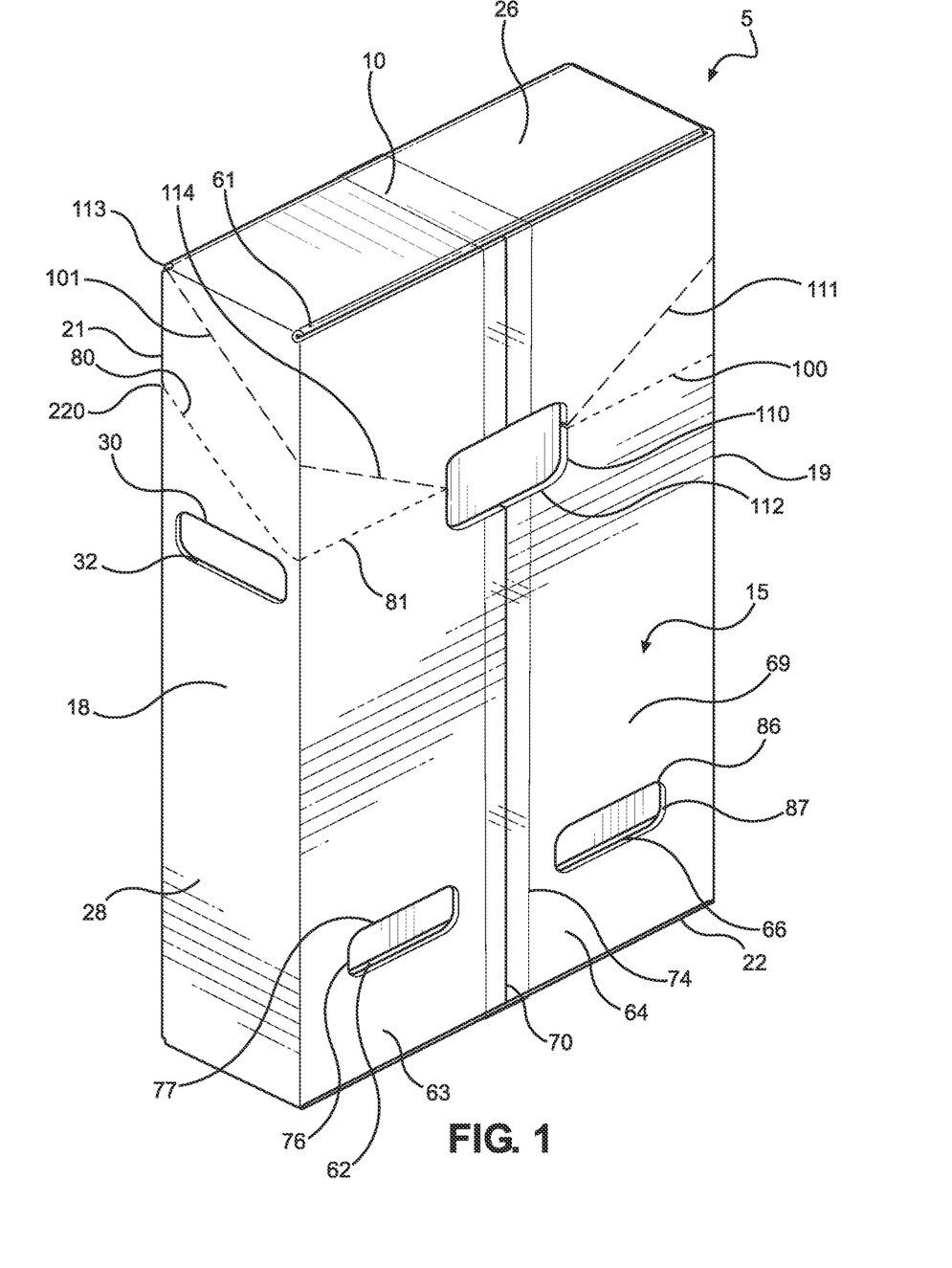
FIG. 1 is an upper perspective view of a carton constructed in accordance with the invention.
Figure 2:
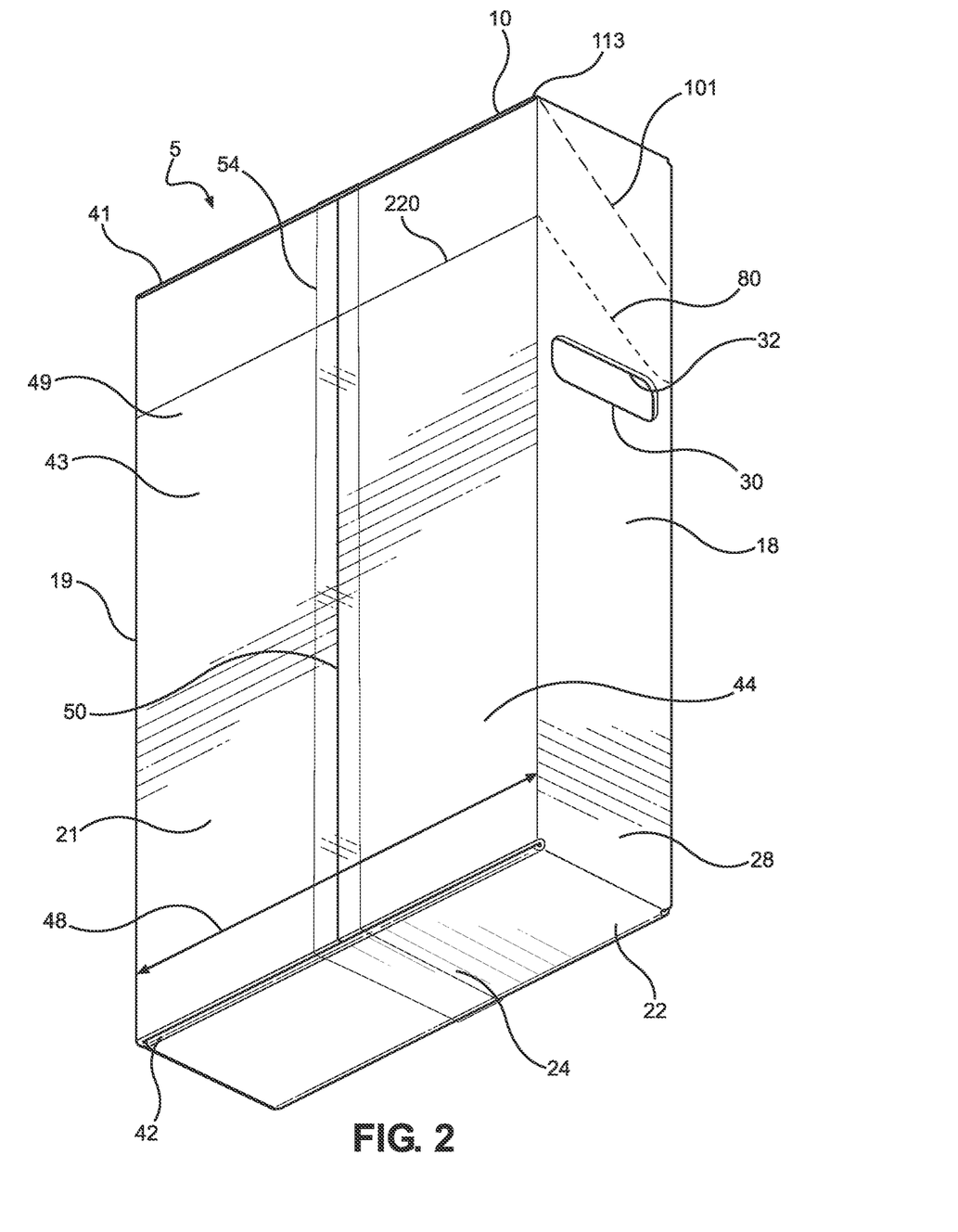
FIG. 2 is a lower perspective view of the carton of FIG. 1.
Figure 3:
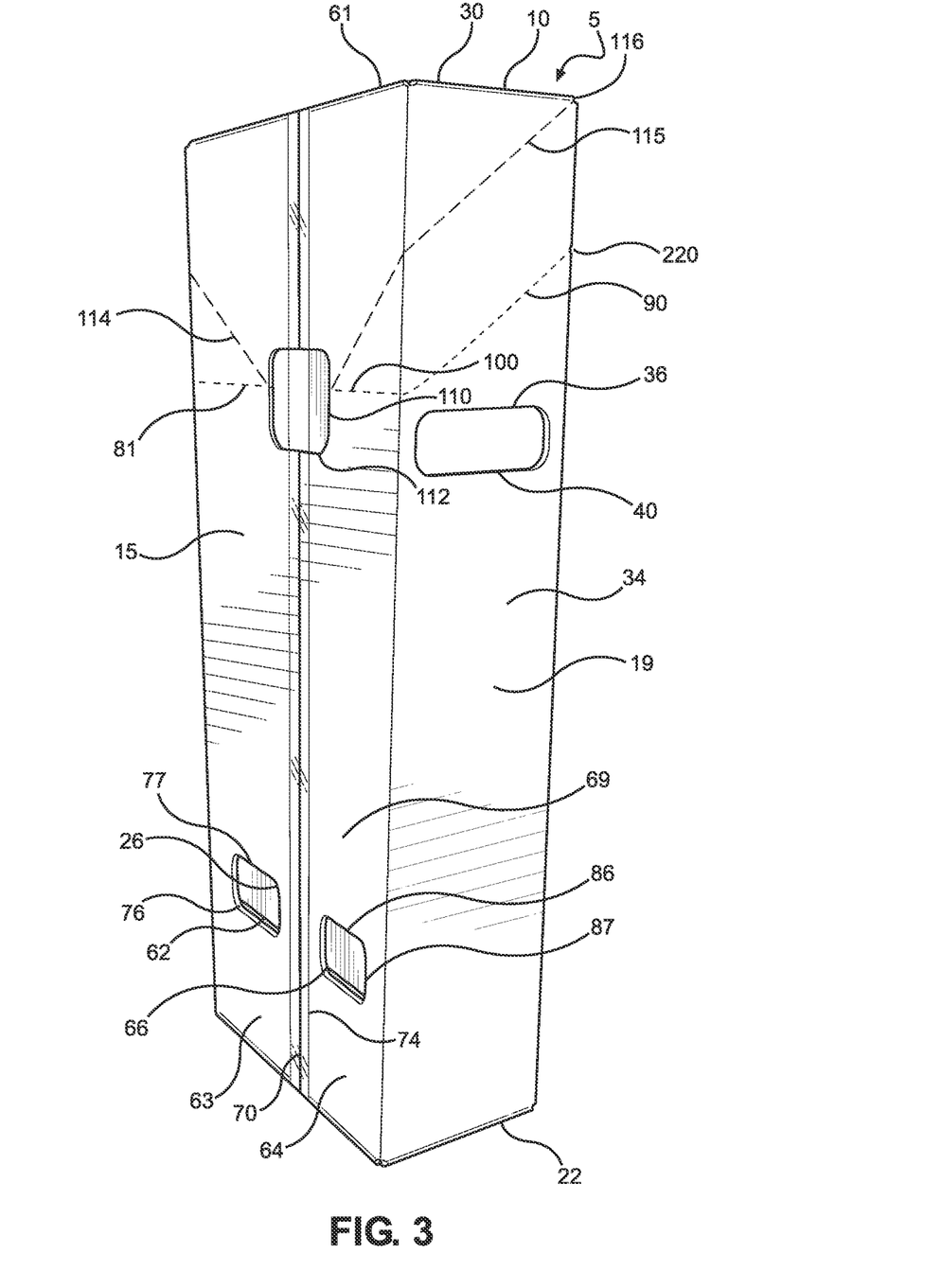
FIG. 3 is a right side perspective view of the carton of FIG. 1.

With initial reference to FIGS. 1-3, a carton constructed in accordance with the present invention is generally indicated at 5. Carton 5 is preferably based on a regular slotted container design. As such, carton 5 has six sides including a top 10, a front 15, a left side 18, a right side 19, back wall 21 and a bottom 22, all rectangular in shape. Bottom 22 is formed of a bottom panel 24 and, in a similar manner, top 10 is formed of a top panel 26. Left side 18 is formed of a first side panel 28 foldably connected to top panel 26 and formed with a cutout 30 defining a handle 32. Likewise, right side 19 is formed of a second side panel 34 foldably connected to top panel 26 and formed with a cutout 36 defining a handle 40. Handles 32 and 40 are provided to assist in carrying container 5. The handles are shown as having an elongated oval or slotted shape. However, other shaped handles may be employed.

As best seen in FIG. 2, back wall 21 is formed of four flaps, specifically top back inner flap 41, bottom back inner flap 42, first back outer flap 43 and second back outer flap 44. The two back inner flaps 41 and 42 are folded to form an inner layer of back panel or wall 21. The first and second back outer flaps 43 and 44 extend approximately one half the carton's width 48 and form an outer layer 49. With this spacing, the first and second back outer flaps 43 and 44 meet at a centerline 50 of carton 5. A slight gap could be formed to reveal first and second back inner flaps 41 and 42, but preferably first and second back outer flaps 43 and 44 are sized to meet without a gap. As illustrated, first and second back outer flaps 43 and 44 are secured to each other with adhesive or tape 54 to increase the strength of carton 5.

As best shown in FIGS. 1 and 3, front 15 has a similar basic construction as back wall 21. More specifically, front 15 is formed of four flaps, i.e., top front inner flap 61, bottom front inner flap 62 and a first outer flap 63 foldably connected to first side panel 28 and a second outer front flap 64 foldably connected to second side panel 34. The two front inner flaps 61 and 62 are folded to form an inner layer 66 of front 15. The two front outer flaps 63 and 64 extend approximately one half of the carton's width 48 and form an outer layer 69. With this spacing, the front outer flaps 63 and 64 meet at a centerline 70 of carton 5. A slight gap may be formed to reveal front inner flaps 61 and 62, but front outer flaps 63 and 64 are preferably sized to meet without a gap. Preferably front outer flaps 63 and 64 are secured to each other with adhesive or tape 74 to increase the strength of carton 5.

Front outer flaps 63 and 64 are formed symmetrically about centerline 70. First front outer flap 63 is formed with a cutout 76 forming a handle 77. Cutout 76 also extends through bottom front inner flap 62. A perforation line 80 (best shown in FIG. 1) starts at back wall 21 and extends across first side panel 28 toward front 15. Perforation line 80 preferably extends downwardly at an angle along first side panel 28. Perforation line 80 then continues across front outer flap 63, at 81, towards centerline 70. Outer flap 64 is formed with a cutout 86 forming a handle 87. Cutout 86 also extends through bottom front inner flap 62. A perforation line 90 (best shown in FIG. 3) starts at back wall 21 and extends across side panel toward front 15. Perforation line 90 preferably extends downwardly at an angle. Perforation line 90 then continues across front outer flap 64 towards centerline 70. Creases, not separately labelled, are preferably formed along perforation lines 81 and 90 on the inside of carton 5. The creases will cause a clean break of the perforations when pressure is applied to side 18 or side 19. A center perforation line 100 runs at right angles to centerline 70 and connects to a central cutout 110 providing for a handle 112.

In an alternative embodiment also collectively shown in FIGS. 1-3, a perforation line 101 extends from a top back corner at a hinge 113 along left side 18 at a downward angle to front outer flap 63. Perforation line 114 then extends to central cutout 110. In a similar manner, a perforation line 115 extends from a top back corner 116 along right side 19 to second outer front flap 64. Perforation line 115 then extends to central cutout 110.

Figure 4:
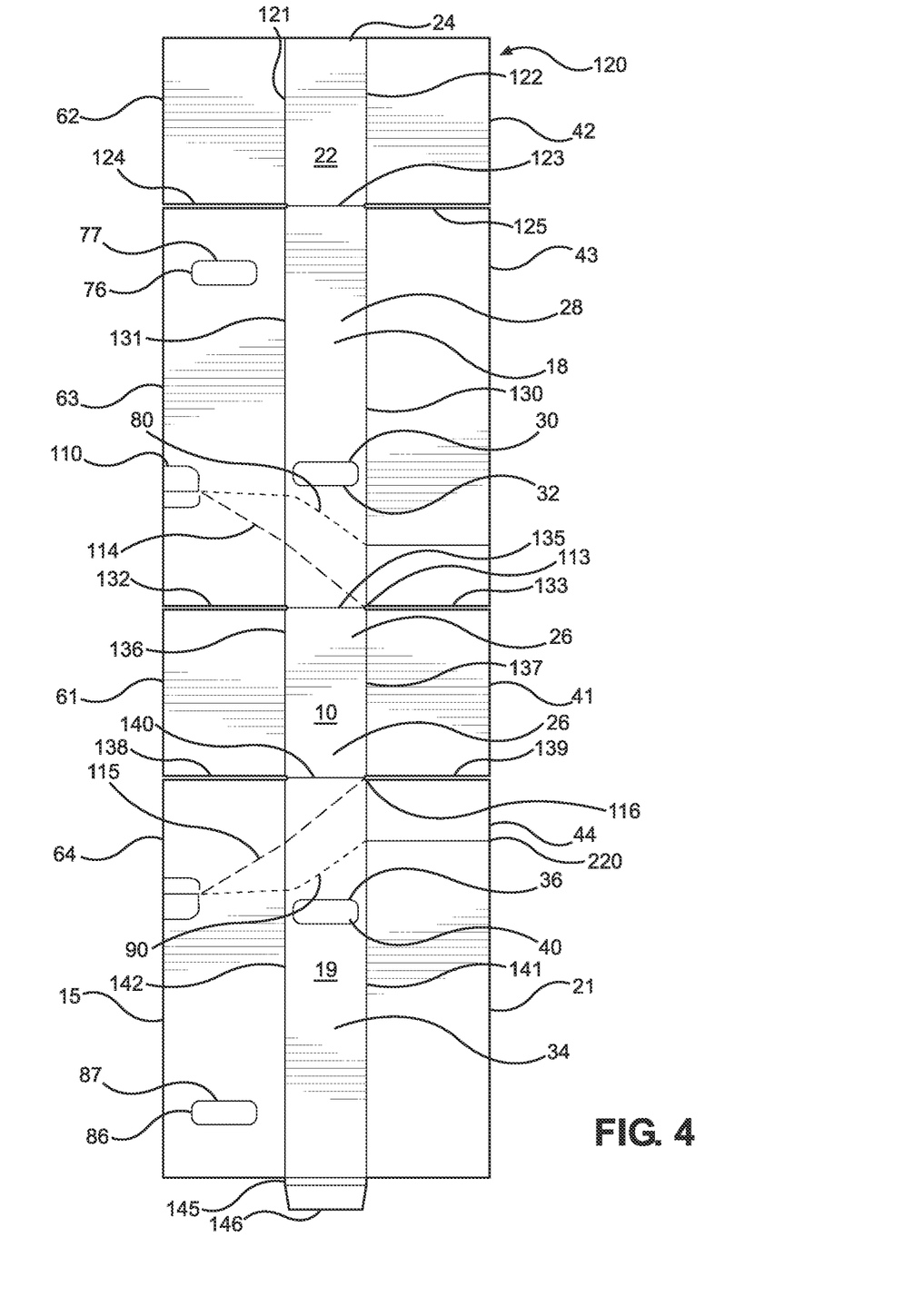
FIG. 4 is a plan view of a cardboard blank from which the carton of FIGS. 1-3 is erected.

In accordance with a preferred embodiment, carton 5 is formed from a blank 120 as shown in FIG. 4. Blank 120 can be made from various materials, particularly cardboard which is widely known for use in the food industry for forming various types of food cartons. In any case, blank 120 is preferably stamped from a single sheet. Bottom panel 24 includes a front connecting fold line 121 leading to bottom front inner flap 62, as well as a back connecting fold line 122 leading to bottom back inner flap 42. As shown, cuts 125 and 124 separate bottom back inner flap 42 from first back outer flap 43 and bottom front inner flap 62 from first outer front flap 63, respectively. Bottom panel 24 is connected to first side panel 28 by a fold line 123. First side panel 28 includes fold lines 130 and 131 leading to first back outer flap 43 and first outer front flap 63, respectively. Cuts 132 and 133 separate top front inner flap 61 from first outer front flap 63 and top back inner flap 41 from first back outer flap 43, respectively. First side panel 28 is also connected to top panel 26 by fold line 135 and also connected to top front inner flap 61 by fold line 136 and top back inner flap 41 by fold line 137. Cuts 138 and 139 separate top front inner flap 61 from second outer front flap 64 and top back inner flap 41 from second back outer flap 44, respectively. Top panel 26 is connected to second side panel 34 by fold line 140 and connected to second outer front flap 64 by fold line 142 and connected to second back outer flap 44 by fold line 141. Second side panel 34 is also connected by a fold line 145 to an end tab 146.

In assembling blank 120 of FIG. 4 into carton 5 of FIGS. 1-3, the various panels are first folded along fold lines 123, 135, 140 and 145. End tab 146 is then secured to bottom panel 24 with adhesive (not shown). Top back inner flap 41 and bottom back inner flap 42 are first folded in. Thereafter, first and second back outer flaps 43 and 44 are folded to meet at centerline 50 and secured by tape 54. Next bottom front inner flap 62 and top front inner flap 61 are folded. Thereafter, first outer front flap 63 and second outer front flap 64 are folded to meet at centerline 70 and sealed by tape 74 to form the final shape shown in FIG. 1. The order of folding panels may be changed such that the front panels may folded before the back panels. As will be discussed further below, carton 5 may be filled with a food bag before carton 5 is closed.

Figure 5:
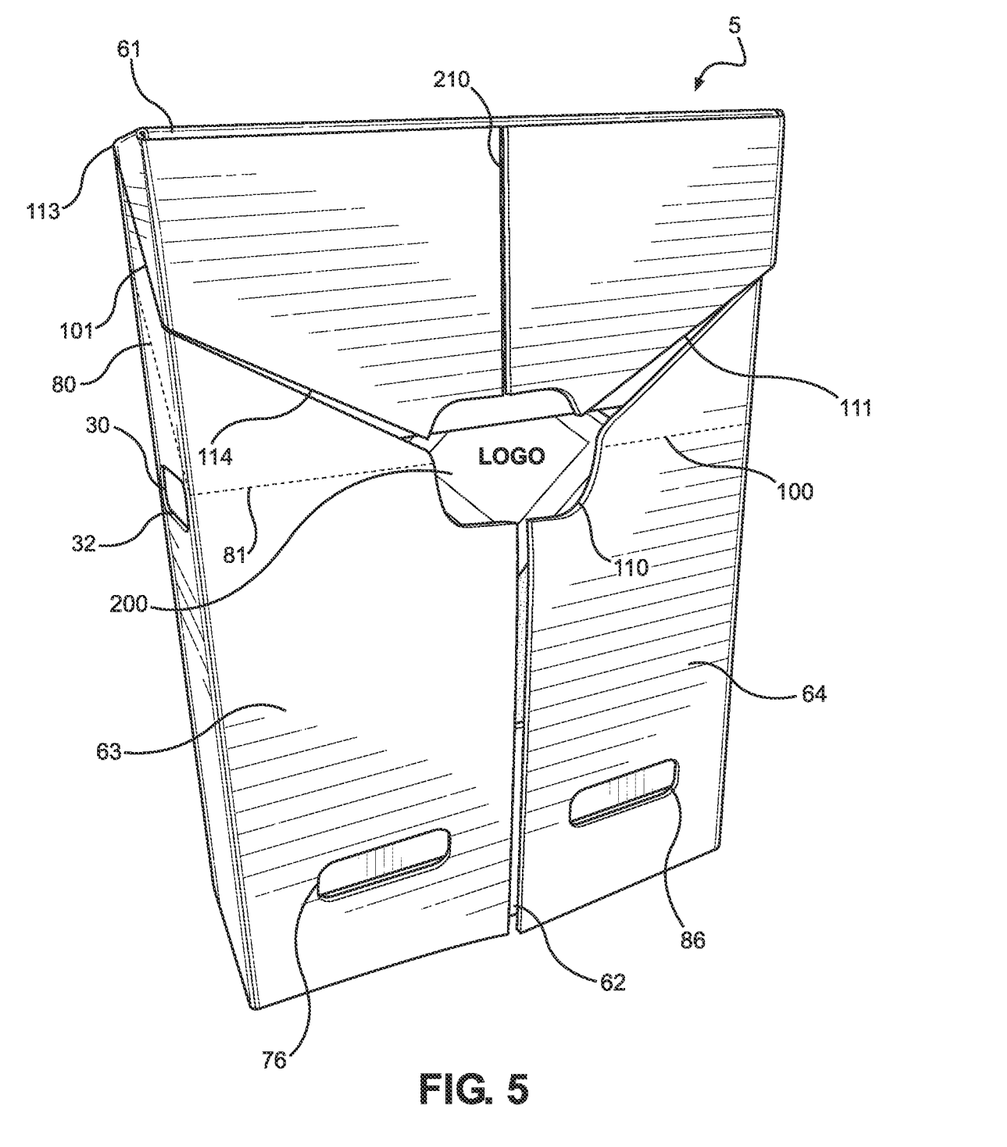
FIG. 5 shows the carton of the invention during an initial opening stage.
Figure 6:
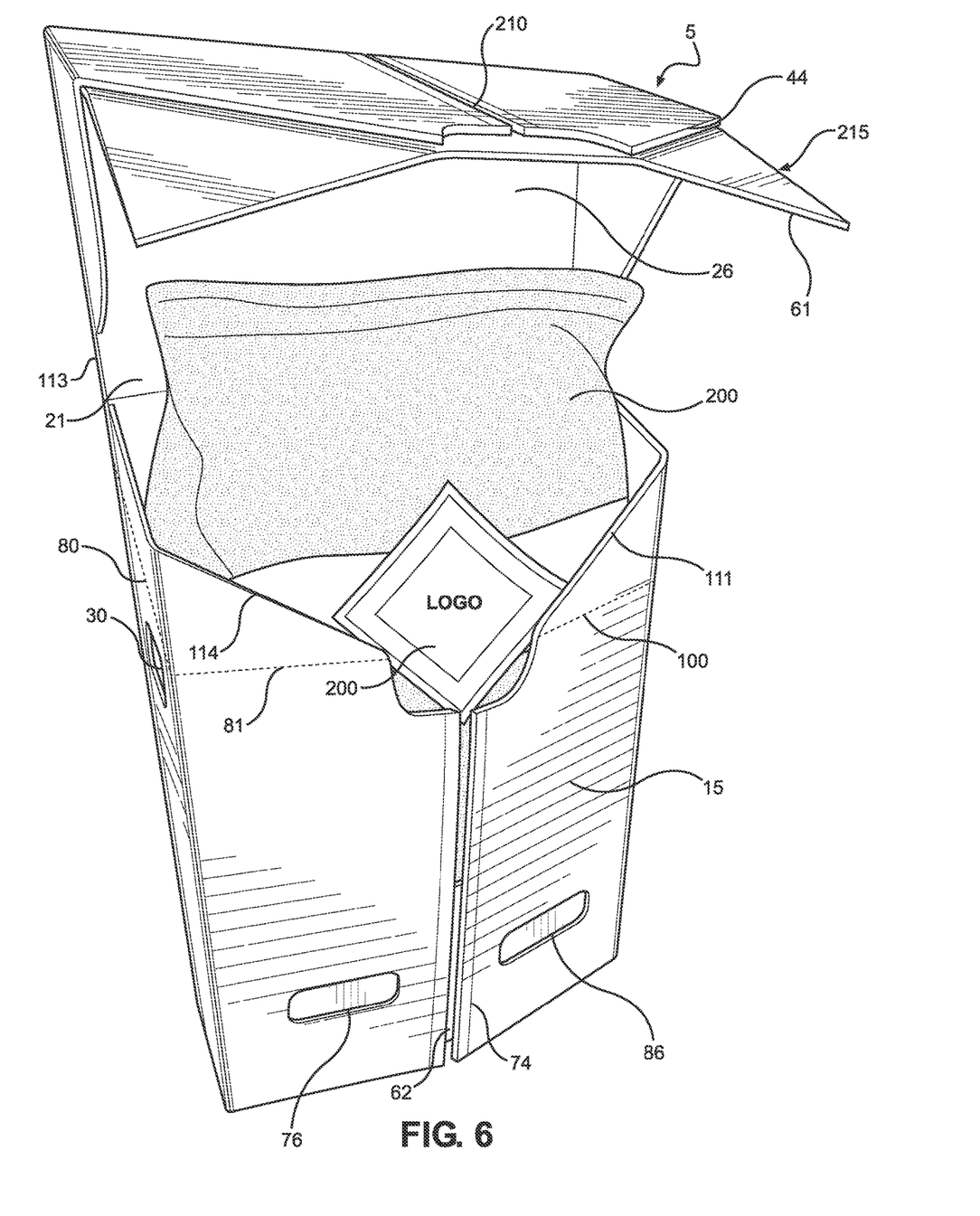
FIG. 6 shows the carton in a fully open stage revealing a pet food bag within the carton.

Turning now to FIGS. 5 and 6, there is shown a pet food bag 200, such as a 30-80 lb, preferably 60-80 lb, dry pet food bag placed inside carton 5, which is preferably used in a method for shipping and storing pet food bag 200. The method includes placing pet food bag 200 or pet food into carton 5 and then sealing carton 5 around pet food bag 200 to form a closed carton 5 which is used for shipping of closed carton 5 in combination with pet food bag 200 to a retail store or directly to a consumer.

Carton 5 is shown with a gap 210 along cut line 114, as well as between first outer front flap 63 and second outer front flap 64. Pet food bag 200 can be seen through central cutout 110. Carton 5 is intended to be opened, not along the adhesive at centerline 70 but rather along perforation lines 111 and 114 which constitute a front tear line segment extending across first outer front flap 63 and second outer front flap 64. Likewise, perforation lines 115 and 101 constitute a first side tear line segment and a second side tear line segment which extend along first outer flap 63 and second outer flap 64, respectively. The perforation lines 101, 111, 114 and 115 are split open by the consumer to extend all the way back to hinge 113 formed by a fold in back wall 21 along the top back edge of carton 5. The splitting open of the perforations forms a lid 215 best seen in FIG. 6. Lid 215 which can be opened, as shown in FIG. 6, to access pet food bag 200. Pet food bag 200 is then opened to feed a pet. Lid 215 can then be closed to store pet food bag 200 within carton 5 until needed.

Alternatively, perforation lines 80, 81, 90 and 100 can be broken open instead of perforation lines 101, 111, 114 and 115, resulting in a different shape for lid 215. The rear panel 21 and the top panel 26 are foldably connected along a top back edge 113 of the carton 5 and the rear panel 21 has a second fold line 220 spaced from the top back edge 113 of the carton 5 forming the hinge. The perforation lines 80 and 90 extend to the second fold line 220 spaced from hinge 113.

Based on the above, it should be readily apparent that the invention provides for a packaging carton which is sturdy so as to fully protect a bag of dry pet food through shipping, yet being specifically configured so as to be easily opened to enable a consumer to readily access the stored bag of dry pet food while also enabling the carton to be used as a storage container for the pet food until the contents of the bag is depleted, whereupon the entire carton can be recycled. Since the carton serves all of these functions, the carton seamlessly provides e-commerce advantages as each bag of pet food can be stored and shipped in packaging having dedicated commercial artwork, such as a company logo or other identifying information.

The invention claimed is:

1. A carton for use in electronic commerce comprising:
   a front panel;
   a rear panel;
   a first side panel;
   a second side panel;
   a bottom panel;
   a top panel, said first side panel foldably connected to the top panel and the second side panel foldably connected to the top panel, the front panel having a first outer flap foldably connected to the first side panel and a second outer flap foldably connected to the second side panel; and
   a lid defined at least partially by perforations along line segments including:
      a front tear line segment extending across the first outer flap and the second outer flap,
      a first side tear line segment extending along the first side panel from the front panel to the rear panel, and
      a second side tear line segment extending along the second side panel from the front panel to rear panel, wherein the rear panel and the top panel are foldably connected along a top back edge of the carton and the rear panel has a second fold line spaced from the top back edge of the carton forming a hinge, the lid being configured to pivot about the hinge.

2. The carton of claim 1, wherein the first side tear line segment and the second side tear line segment extend to the hinge.

3. The carton of claim 1, wherein at least one of the first side panel and second side panel is formed with a handle.

4. The carton of claim 1, wherein the first side tear line segment and the second side tear line segment are each formed along a respective crease.

5. A carton for shipping a bag of pet food in combination with the bag of pet food in electronic commerce comprising:
   a front panel, a rear panel, a first side panel, a second side panel, a bottom panel, and a top panel, said first side panel foldably connected to the top panel and the second side panel foldably connected to the top panel, the front panel having a first outer flap foldably connected to the first side panel and a second outer flap foldably connected to the second side panel, and a lid defined at least partially by perforations along line segments including a front tear line segment extending across the first outer flap and the second outer flap and a first side tear line segment extending along the first side panel from the front panel to the rear panel and a second side tear line segment extending along the second side panel from the front panel to rear panel, wherein the rear panel and the top panel are foldably connected along a top back edge of the carton and the rear panel has a second fold line spaced from the top back edge of the carton forming the hinge, the lid being configured to pivot about the hinge for movement between open and closed positions; and
   a bag of pet food stored in the carton during shipping and accessible when the lid is in the open position.

6. The carton of claim 5, wherein the first side tear line segment and the second side tear line segment extend to the hinge.

7. The carton of claim 5, wherein at least one of the first side panel and second side panel is formed with a handle.

8. The carton of claim 5, wherein the first side tear line segment and the second side tear line segment are each formed along a respective crease.

9. A method of shipping and storing a bag of pet food in a carton for use in electronic commerce including a front panel, a rear panel, a first side panel, a second side panel, a bottom panel, and a top panel, said first side panel foldably connected to the top panel and the second side panel foldably connected to the top panel, the front panel having a first outer flap foldably connected to the first side panel and a second outer flap foldably connected to the second side panel, and a lid defined at least partially by perforations along line segments including a front tear line segment extending across the first outer flap and the second outer flap and a first side tear line segment extending along the first side panel from the front panel to the rear panel and a second side tear line segment extending along the second side panel from the front panel to rear panel, wherein the rear panel and the top panel are foldably connected along a top back edge of the carton and the rear panel has a second fold line spaced from the top back edge of the carton forming the hinge, the lid being configured to pivot about the hinge, said method comprising:
   placing the bag of pet food into the carton;
   closing the carton around the bag to form a closed carton;
   shipping the closed carton; and
   selling the closed carton with the bag of pet food.

\* \* \* \* \*